US012606731B2

(12) United States Patent (10) Patent No.: US 12,606,731 B2
Sugimoto et al. (45) Date of Patent: Apr. 21, 2026

(54) RESIN COMPOSITION AND HEAT-DISSIPATING MEMBER

(71) Applicant: SEKISUI CHEMICAL CO., LTD., Osaka (JP)

(72) Inventors: Masataka Sugimoto, Atsugi (JP); Osamu Inui, Yao (JP); Izumi Matsumoto, Kyoto (JP); Tetsurou Yoshioka, Kyoto (JP); Abison Scaria, Takatsuki (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 915 days.

(21) Appl. No.: 17/770,490

(22) PCT Filed: Oct. 22, 2020

(86) PCT No.: PCT/JP2020/039793
§ 371 (c)(1),
(2) Date: Apr. 20, 2022

(87) PCT Pub. No.: WO2021/079954
PCT Pub. Date: Apr. 29, 2021

(65) Prior Publication Data
US 2022/0389300 A1 Dec. 8, 2022

(30) Foreign Application Priority Data

Oct. 24, 2019 (JP) ................................. 2019-193752

(51) Int. Cl.
*C09K 5/14* (2006.01)
*C08K 3/04* (2006.01)

(52) U.S. Cl.
CPC .................. *C09K 5/14* (2013.01); *C08K 3/04* (2013.01); *C08K 2201/001* (2013.01); *C08K 2201/005* (2013.01)

(58) Field of Classification Search
CPC ................ C09K 5/14; C08K 2201/001; C08K 2201/005
See application file for complete search history.

(56) References Cited

U.S. PATENT DOCUMENTS

| | | | | |
|---|---|---|---|---|
| 5,672,395 A | * | 9/1997 | Anthony | ................. C23C 16/27 |
| | | | | 427/372.2 |
| 2005/0045855 A1 | * | 3/2005 | Tonapi | .................... H01L 24/29 |
| | | | | 252/500 |
| 2006/0130998 A1 | | 6/2006 | Ludtke | |
| 2010/0197533 A1 | * | 8/2010 | Kendall | ............... C10M 171/06 |
| | | | | 508/108 |
| 2017/0081579 A1 | * | 3/2017 | Fujikawa | ................. C08K 3/22 |
| 2020/0216659 A1 | | 7/2020 | Kawahara et al. | |
| 2021/0147739 A1 | | 5/2021 | Sugimoto et al. | |

FOREIGN PATENT DOCUMENTS

| | | | |
|---|---|---|---|
| CN | 112204106 | 1/2021 | |
| EP | 0379773 A1 * | 8/1990 | ............ C09J 163/00 |
| JP | 2002-30217 | 1/2002 | |
| JP | 2006-524173 | 10/2006 | |
| JP | 2012-7057 | 1/2012 | |
| JP | 2012-25930 | 2/2012 | |
| JP | 2012-161965 | 8/2012 | |
| JP | 2012-201878 | 10/2012 | |
| JP | 2016-191030 | 11/2016 | |
| JP | 2018-111814 | 7/2018 | |
| JP | 2018-111817 | 7/2018 | |
| JP | 2019-6662 | 1/2019 | |
| JP | 2019-89956 | 6/2019 | |
| JP | 2019-89957 | 6/2019 | |
| TW | 201718763 | 6/2017 | |
| TW | 201927898 | 7/2019 | |
| WO | WO-9918030 A2 * | 4/1999 | ......... H01L 23/3732 |
| WO | WO-2008007336 A2 * | 1/2008 | ............. C30B 29/04 |
| WO | 2018/235918 | 12/2018 | |

OTHER PUBLICATIONS

International Search Report (ISR) issued Dec. 28, 2020 in International (PCT) Application No. PCT/JP2020/039793.

* cited by examiner

*Primary Examiner* — Jane L Stanley
(74) *Attorney, Agent, or Firm* — Wenderoth, Lind & Ponack, L.L.P.

(57) ABSTRACT

There is provided a resin composition containing a resin component and diamond particles, the diamond particles having the total metal content constituted from iron, nickel, cobalt, and chromium of 5 ppm or higher and 300 ppm or lower.

10 Claims, No Drawings

RESIN COMPOSITION AND HEAT-DISSIPATING MEMBER

TECHNICAL FIELD

The present invention relates to a heat-dissipating member to be used in electronic devices or the like, and a resin composition for forming the heat-dissipating member.

BACKGROUND ART

In electronic devices, since integrated electronic parts generate heat, which causes failures, there are sometimes installed heat-dissipating members for dissipating heat generated by the electronic parts outside the devices. The heat-dissipating members are arranged, for example, between an electronic part and a housing, a heat sink or the like. The heat-dissipating members are usually ones in which a resin or elastomer is blended with a thermally conductive filler. For example, Patent Literature 1 discloses a thermally conductive silicone grease composition in which an organopolysiloxane is blended with plural kinds of aluminum oxide having mutually different average particle diameters as a thermally conductive filler.

CITATION LIST

Patent Literature

PTL 1: JP 2012-7057 A

SUMMARY OF INVENTION

Technical Problem

In recent years, along with size reduction and performance enhancement of electronic devices, there have been demanded technologies of efficiently dissipating heat generated accompanying driving. Hence, in recent years, it has been studied to use, as a thermally conductive filler for heat-dissipating members, a diamond particle having high thermal conduction properties and having electric insulation properties. Diamond particles industrially used are usually synthetic diamond produced by a high-temperature high-pressure method or the like, but resin compositions including the synthetic diamond may cause disadvantages such as lowering electric insulation properties and not sufficiently improving thermal conduction properties.

Then, the present invention aims at raising the thermal conduction properties without lowering the electric insulation properties in a resin composition containing diamond particles.

Solution to Problem

As a result of studies on the factor of, when diamond particles are made to be contained in a resin composition, deteriorating the electric insulation properties and not sufficiently improving the thermal conduction properties, the present inventors have made clear that specific metal impurities contained in the diamond inside are the factor. That is, it has been found that a synthetic diamond particle produced by a high-temperature high-pressure method or the like inevitably contains trace amounts of impurities of metals used in a catalyst and the like therein, and the trace amounts of the metals deteriorate the electric insulation properties and the thermal conduction properties of the diamond particle itself, and go outside the particle and lower the electric insulation properties of the resin composition. Further, it has been made clear that when the amounts of metal impurities inevitably mingled in the inside of the diamond particle becomes low, the hardness of the diamond particle is enhanced, leading to the occurrence of breakage, abrasion and the like thereof during mixing with a resin component, or the like and then to lowering of the thermal conduction properties and to the increase of the amount of the metal impurities going outside, which becomes a factor of lowering the electric insulation properties.

The present inventors have found that based on the above finding, the above problem can be solved by using diamond particles having amounts of impurities of specific metal species in predetermined ranges, and this finding has led to the completion of the following present invention. That is, the present invention provides the following [1] to [11].

[1] A resin composition, comprising a resin component and diamond particles, the diamond particles having a total metal content constituted from iron, nickel, cobalt, and chromium of 5 ppm or higher and 300 ppm or lower.

[2] The resin composition according to the above [1], wherein the diamond particles have a content of iron of 5 ppm or higher and 200 ppm or lower.

[3] The resin composition according to the above [1] or [2], wherein the diamond particles have a content of nickel of 1 ppm or higher and 40 ppm or lower.

[4] The resin composition according to any one of the above [1] to [3], wherein the diamond particles have an average particle diameter of primary particles of 0.1 μm or larger.

[5] The resin composition according to any one of the above [1] to [4], wherein the resin composition has a filling fraction of the diamond particles of 30% by volume or higher and 90% by volume or lower.

[6] The resin composition according to any one of the above [1] to [5], wherein the resin component is at least one selected from the group consisting of epoxy resins, silicone resins, acryl resins, polybutadiene rubbers and polyester resins.

[7] The resin composition according to any one of the above [1] to [6], wherein the resin composition further comprises another thermally conductive filler.

[8] The resin composition according to the above [7], wherein the resin composition comprises, as the other thermally conductive filler, at least one or more selected from the group consisting of carbides, nitrides, oxides, hydroxides and carbon materials other than diamond.

[9] The resin composition according to the above [8] or [9], wherein the other thermally conductive filler has an average particle diameter of primary particles of 0.1 μm or larger and 200 μm or smaller.

[10] A heat-dissipating member, which is formed of a resin composition according to any one of the above [1] to [9].

[11] An electronic device, comprising a heat-dissipating member according to the above [10].

Advantageous Effects of Invention

According to the present invention, in a resin composition containing diamond particles, the thermal conduction properties can be made good without lowering the electric insulation properties.

DESCRIPTION OF EMBODIMENTS

Hereinafter, the present invention will be described by way of embodiments.

[Resin Composition]

The resin composition of the present invention comprises a resin component and diamond particles. The resin composition of the present invention, due to containing, as a thermally conductive filler, diamond particles high in thermal conductivity and volume resistivity, can make the electric insulation properties and the heat dissipation properties good.

(Diamond Particles)

In the present invention, the total metal content constituted from iron, nickel, cobalt, and chromium in the diamond particles contained in the resin composition is 5 ppm or higher and 300 ppm or lower. Diamond particles industrially used are usually synthetic diamond synthesized by using a metal catalyst. The residue of the metal catalyst used for the synthesis of the diamond, when being mingled in the diamond particle inside, results in becoming a factor of lowering the electric insulation properties and the thermal conduction properties of the diamond particle itself, or goes outside the particle due to crushing, abrasion, or the like of the particle and results in becoming a factor of lowering the electric insulation properties of the resin composition. Then, the metal catalyst to be used for synthesis of the synthetic diamond is practically any of iron, nickel, cobalt and chromium. Hence, if the total content of these metals in the diamond particles becomes higher than 300 ppm, the residue of the metal catalyst might lower the thermal conduction properties of the resin composition containing the diamond particles and further might lower the electric insulation properties as well.

If the diamond particles have a total metal content of lower than 5 ppm and is high in purity, since the hardness of the diamond becomes too high, making it easy for the diamond particles to be crushed or abraded during mixing with the resin component, or the like, the thermal conduction properties might be lowered, or metal impurities might go outside and the electric insulation properties might be lowered.

The above total metal content is preferably 300 ppm or lower, more preferably 150 ppm or lower and still more preferably 80 ppm or lower. When the amount of metals contained in the diamond particles is made to be 150 ppm or lower, it becomes easy for the electric insulation properties and the thermal conduction properties of the resin composition to be more improved. Further, the above total metal content is preferably 5 ppm or higher, more preferably 10 ppm or higher and still more preferably 15 ppm or higher. When being made to be 15 ppm or higher, it becomes difficult for the diamond particles to be crushed or abraded, making it easy for the thermal conduction properties and the electric insulation properties to be improved. With regard to a method of reducing impurities in the diamond particles, the impurities can be reduced usually by reducing the amount of impurities to be charged in synthesis of the diamond and synthesizing the diamond by using a seed crystal in diamond production and taking time. Further, with regard to a method of increasing impurities in the diamond particles, the impurities can be increased by increasing the amount of impurities to be charged in synthesis of the diamond and synthesizing the diamond without using a seed crystal and in a short time. Furthermore, when the amount of impurities is intended to be in the above range, diamonds having different amounts of impurities may be prepared and blending of the diamonds may be regulated so that the amount of the diamonds becomes the predetermined amount, whereby the thermal conductivity and the electric insulation properties can be improved.

The content of iron in the diamond particles is preferably 5 ppm or higher and 200 ppm or lower. Iron among the above metals relatively largely affects the electric insulation properties and the thermal conduction properties, and by making the content of iron to be in the above range, the electric insulation properties and the thermal conduction properties can be made much better. From these viewpoints, the content of iron is more preferably 7 ppm or higher, and more preferably 100 ppm or lower and still more preferably 50 ppm or lower.

The content of nickel in the diamond particles is preferably 1 ppm or higher and 40 ppm or lower. By making the content of nickel to be in the above range, it becomes easy for the electric insulation properties and the thermal conduction properties to be made good. From these viewpoints, the content of nickel is more preferably 2 ppm or higher and still more preferably 3.5 ppm or higher, and more preferably 30 ppm or lower and still more preferably 25 ppm or lower.

Here, the content of each metal species can be measured by ICP analysis. Specifically, as described in Examples later, the diamond particles are heated and burned off at 900° C. for 48 hours; and the residue is further decomposed by a mixed liquid of nitric acid and hydrochloric acid at 150° C.; then, the decomposed material is quantitatively analyzed by ICP analysis to determine the content of each metal species. Then, the total of the determined contents of the above four metal species becomes the total metal content. Here, the content of each metal species and the total content are expressed in ppm based on the diamond particle weight. The metal in the diamond particles suffices if containing one or more kinds thereof, and has no need of containing all the above four kinds.

When the content of each metal species is measured, it suffices if the diamond particles contained in the resin composition are separated from the resin composition and heated at 900° C. as described above, and at this time, the separation may be made, for example, by dissolving the resin component in a solvent and thereafter separating the diamond particles from the resin component by centrifugation or the like.

In the case where a thermally conductive filler (other thermally conductive filler) other than the diamond particles is further contained, it suffices, for example, if the whole of the thermally conductive filler is separated from the resin composition and the whole of the separated thermally conductive filler is heated at 900° C. as described above. Here, since the thermally conductive filler other than the diamond particles is not generally decomposed in the above heating, but the diamond particles are decomposed and burned off, the weight of the diamond particles can be determined by subtracting the weight of the thermally conductive filler remaining after the above heating from the weight of the whole of the separated thermally conductive filler. Then, since the residue excluding the thermally conductive filler after the heating is substantially a component originated from the diamond particles, by carrying out ICP analysis on the residue component, each metal species in the diamond particles can be quantitatively analyzed. Then, the content (ppm by weight) of each metal in the diamond particles can be determined from the analysis result and the weight of the diamond particles.

The diamond particle is, as described above, typically a synthetic diamond. The diamond particle may be synthesized by a detonation method, or may also be synthesized by a high-temperature high-pressure method. By the detonation method, there can be synthesized the diamond particle (nano-diamond particle) having a nanoparticle size of an average particle diameter of primary particles in levels of a few nanometers to several tens of nanometers. On the other hand, by the high-temperature high-pressure method, there can be obtained the diamond particles having a particle diameter of primary particles in μm levels. It is preferable, from the viewpoint of obtaining the diamond particles having a sufficient particle diameter, that the diamond particles are synthesized by the high-temperature high-pressure method. By synthesizing the diamond particles by the high-temperature high-pressure method, there can be obtained the diamond particles which do not exhibit aggregation and, as described later, are not nano-diamond particles and are large in the average particle diameter of primary particles.

In the high-temperature high-pressure method, practically, the diamond can be synthesized by crystallizing a carbon raw material such as graphite in the presence of a catalyst of at least one metal selected from the group consisting of iron, nickel, cobalt and chromium under high temperature and high pressure. The diamond thus synthesized usually becomes globular. The diamond synthesized by the crystallization under high temperature and high pressure, as required, may favorably be subjected suitably to crushing or the like to turn to a diamond particle having a crushed shape. The diamond particles synthesized by the high-temperature high-pressure method are, as required, subjected to a cleaning treatment such as acid cleaning, or a reducing treatment using hydrogen gas, or the like.

In the present invention, for example, by suitably regulating the amount of the metal catalyst to be used in diamond synthesis, the total metal content contained in the diamond particles can be regulated in the above range. A commercially available product may be used as the diamond particles. Specifically, the commercially available product includes series such as "TMS" and "CMM", manufactured by Tomei Diamond Co., Ltd., "MDA" and "PDA", manufactured by Element Six Co., Ltd., "IMPM" and "IMD", manufactured by Ijin Diamond Co., Ltd., and "MBG" and "GMM", manufactured by Hyperion Materials & Technologies Inc.

The average particle diameter of primary particles of the diamond particles is preferably 0.1 μm or larger. By making the diameter to be 0.1 μm or larger, it becomes easy for the thermal conduction properties of the resin composition to be raised. In the case where the resin component is a liquid component, the resin composition can be prevented from increasing in the viscosity and made to have a low viscosity. Hence, it becomes easy for the coatability, the formability and the like to be made good. The average particle diameter of the diamond particles is, from these viewpoints, more preferably 0.5 μm or larger and still more preferably 1 μm or larger. By synthesizing the diamond particles by the high-temperature high-pressure method as described above, the diamond particles can be made not to exhibit aggregation and have a large average particle diameter of primary particles.

Further, it is preferable to make the average particle diameter of primary particles of the diamond particles to be 200 μm or smaller. By making the diameter to be 200 μm or smaller, the diamond particles become enabled to be suitably dispersed in the resin composition and to be contained at a high filling fraction. From these viewpoints, the average particle diameter of primary particles of the diamond particles is more preferably 150 μm or smaller and still more preferably 100 μm or smaller.

Here, the average particle diameter of primary particles is an average particle diameter obtained by averaging particle diameters in terms of volume, and can be measured by using, for example, a "laser diffraction type particle size distribution analyzer", manufactured by HORIBA Ltd. In a method of calculating the average particle diameter of primary particles, the particle diameter (d50) at a cumulative volume of 50% can be taken as the average particle diameter.

The sphericity of the diamond particles is, for example, 0.5 or higher, preferably 0.55 or higher and more preferably 0.6 or higher. The sphericity is an index indicating being closer to a sphere the nearer the sphericity is to 1; and when the sphericity is made high, it becomes easy for the diamond particles to be dispersed in the resin component, and further it becomes easy also for the filling fraction to be raised. The upper limit of the sphericity is not especially limited, and is 1.

Here, the sphericity of each filler can be determined by examining an electron microscope photograph and calculating "the diameter of a circle whose area is equivalent to a projected area of a particle/the diameter of the smallest circle circumscribing a projected image of the particle" for 300 particles in the obtained image, and averaging the 300 results.

The specific shape of the diamond particle is not especially limited, and may be, for example, globular, a crushed shape or another shape. Being globular means being sphere or a shape approximating to a sphere; and in the present description, a shape having a sphericity of 0.8 or higher is defined as being globular. Further, the crushed shape refers to a shape micronized by crushing, and usually has an angular shape. The crushed shape has, for example, a sphericity of 0.5 or higher and lower than 0.8, and preferably a sphericity of 0.55 or higher and lower than 0.8 and more preferably a sphericity of 0.6 or higher and lower than 0.8. When the diamond particle is made to have a globular or crushed shape, it becomes easy for the filling fraction of the diamond particles to be raised and particularly by making the shape to be globular, it becomes easier for the filling fraction to be raised.

In the present invention, it is preferable that the diamond particles contained in the resin composition contain two or more kinds of diamond having different average particle diameters of primary particles from each other. When two or more kinds of diamond having different average particle diameters are used, particles having smaller average particle diameter of the diamond particles get into between particles having larger average particle diameter of the diamond particles, making it easy that the diamond particles are suitably dispersed in the resin component and simultaneously the filling fraction of the diamond particles is raised. Here, the resin composition can be judged to have two or more kinds of diamond having different average particle diameters by the fact that in a particle size distribution of the diamond particles, two or more peaks emerge. This applies similarly to other thermally conductive filler and the like described later.

In the case of containing two or more kinds of diamond particles having different average particle diameters of primary particles, it is preferable that the diamond particles are a mixture of diamond particles having an average particle diameter of primary particles of 10 μm or larger and 200 μm or smaller (hereinafter, referred to also as "large particle diameter diamond") and diamond particles having an average particle diameter of 0.1 μm or larger and smaller than 10 μm (hereinafter, referred to also as "small particle diameter diamond").

By thus using both of the large particle diameter diamond and the small particle diameter diamond, the diamond particles are suitably dispersed in the resin component and simultaneously the filling fraction of the diamond is raised, whereby it becomes easy for the thermal conductivity to be raised.

In the case where the diamond particles contain both of the small particle diameter diamond and the large particle diameter diamond, the volume ratio (large particle diameter/ small particle diameter) of the large particle diameter diamond to the small particle diameter diamond is, for example, 0.1 or higher and 10 or lower, preferably 0.25 or higher and 8 or lower and more preferably 0.5 or higher and 5 or lower.

The average particle diameter of primary particles of the large particle diameter diamond is more preferably 15 μm or larger and 200 μm or smaller, still more preferably 18 μm or larger and 150 μm or smaller and further still more preferably 20 μm or larger and 100 μm or smaller.

The shape of the large particle diameter diamond may be any shape, but the crushed shape or the globular shape described above is preferable.

The average particle diameter of primary particles of the small particle diameter diamond is more preferably 0.2 μm or larger and 8 μm or smaller, still more preferably 0.5 μm or larger and 7 μm or smaller and further still more preferably 1 μm or larger and 7 μm or smaller. The shape of the small particle diameter diamond may be any shape, but the crushed shape is preferable. The small particle diameter diamond of the crushed shape can easily be produced by crushing the synthetic diamond.

In the case of containing two or more kinds of the diamonds having different average particle diameters of primary particles, the diamond particles do not need to contain both of the small particle diameter diamond and the large particle diameter diamond, and is allowed to contain the small particle diameter diamonds alone. The diamond particles are similarly allowed to contain the large particle diameter diamonds alone.

In the present invention, the filling fraction of the diamond particles is preferably 30% by volume or higher and 90% by volume or smaller, more preferably 40% by volume or higher and 87% by volume or smaller and still more preferably 45% by volume or higher and 85% by volume or smaller. In the present invention, by making the filling fraction of the diamond particles to be not lower than these lower limit values, it becomes easy for the thermal conductivity to be raised. By making that to be not higher than the upper limit values, the diamond particles can suitably be dispersed in the resin composition.

In the case of using singly the diamond particles as the thermally conductive filler (that is, in the case of using no thermally conductive filler other than the diamond particles), in order to raise the thermal conductivity, preferably the filling fraction of the diamond particles is made high. Therefore, in the case of using singly the diamond particles as the thermally conductive filler, the filling fraction of the diamond particles is preferably 50% by volume or higher and 90% by volume or lower, more preferably 55% by volume or higher and 85% by volume or lower, and still more preferably 60% by volume or higher and 80% by volume or lower.

Here, the "filling fraction" in the present description means a percent by volume with respect to the total volume of the resin composition; for example, the filling fraction of the diamond particles means a percent by volume taken by the diamond particles in the total volume of the resin composition. The volume of each component can be calculated from the weight and the specific gravity of each component.

The diamond particles to be used in the present invention may be surface-treated. When the diamond particles are surface-treated, it becomes easy for the diamond particles to conform to the resin and it becomes easy for a large amount of the diamond particles to be homogeneously dispersed in the resin component. Further since there is no need of blending a compound for dispersing the diamond particles, such as a silane compound, in the resin composition, while there are suppressed lowerings of the viscosity, the thixotropy, the wettability, the thermal conductivity and the like of the resin composition, the diamond particles become enabled to be dispersed.

The diamond particles are favorably surface-treated with a surface treating agent such as a silane compound, an organotitanium compound, an organoaluminum compound or a phosphate compound, or the like, and surface-treated preferably with the silane compound. The silane compound to be used for the surface treatment is not especially limited, and examples thereof include alkoxysilanes and chlorosilanes, and alkoxysilanes are preferable.

The amount of the surface treating agent adhered on the diamond particles is, with respect to the diamond particles, for example, 0.01% by mass or larger and 3% by mass or smaller, and preferably 0.02% by mass or larger and 2.5% by mass or smaller.

A method of the surface treatment using the silane compound is not especially limited, and the surface treatment may be carried out by a well-known method, and can use, for example, a wet treatment method, a dry treatment method or a pretreatment method.

In the wet treatment method, for example, the diamond particles may be added and mixed in a solution in which the silane compound is dispersed or dissolved, and thereafter, the resultant may be heat-treated to thereby bind or adhere the silane compound to the surface of the diamond particles.

The dry treatment method is a method carrying out the surface treatment without using a solution; and specifically, the method is such that the diamond particles are mixed with the silane compound and stirred by a mixer or the like, and thereafter heat-treated to thereby bind or adhere the silane compound to the surface of the diamond particles.

The pretreatment method is a method in which the diamond particles and additionally water are added and mixed in a solution in which the silane compound is dispersed or dissolved to cause the silane compound to react with the added water to thereby bind or adhere the silane compound to the surface of the diamond particles, and thereafter subjected to cleaning, drying and the like.

In the case of using two or more kinds of the diamond particles, all the kinds thereof may be surface-treated, or some parts of the kinds thereof may be surface-treated, but it is preferable that all the kinds thereof are surface-treated. In the case where two or more kinds of the diamond particles are surface-treated, the two or more kinds thereof may be mixed, and then simultaneously surface-treated, but may be surface-treated separately.

(Resin Component)

The resin component is a component to hold the diamond particles, or the diamond particles and other thermally conductive filler described later. The resin component may be a curable resin, or may also be a non-curable resin such as a thermoplastic resin, or may also be an elastomer resin. The curable resin may be any of a moisture-curable one, a thermosetting one and a photocurable one, but a thermosetting one is preferable. The resin component may be a liquid component or may be a solid component. The resin component of a liquid component may be one to become a solid with being cured, or may be one which is non-curable and remains as it is liquid in a heat-dissipating member. Here, the liquid component refers to a component which is liquid at room temperature (25° C.) and normal pressure (1 atm).

In the case of the curable resin, the resin component may be of either of one-component curable type and two-component curable type, but is preferably a two-component curable type one. In the case of using the two-component curable type, the resin composition can be prepared by mixing a first component containing a base component with a second component containing a curing agent. The two-component curable type may be cured at room temperature by mixing the first component with the second component. Here, in the case of the two-component curable type, the diamond particles may be blended in one of the first component and the second component, or may be blended in both the components, but the latter is preferable. This preference applies similarly to other thermally conductive filler described later.

Specific examples of the resin component include silicone resins, epoxy resins, acryl resins, urethane resins, phenol resins, unsaturated polyester resins, polyimide resins, poly-olefin resins such as polypropylene resins, polyethylene resins, poly(1-)butene resins and polypentene resins, plyes-ter resins such as polyethylene terephthalate, polystyrene resins, acrylonitrile-butadiene-styrene (ABS) resins, ethyl-ene vinyl acetate copolymers (EVA), polyamide resins and polyvinyl chloride resins (PVC).

Further, the resin component may be an elastomer resin, and specifically includes acrylonitrile-butadiene rubber, eth-ylene-propylene-diene rubber, ethylene-propylene rubber, natural rubber, polybutadiene rubber, polyisoprene rubber, polyester-based thermoplastic elastomer, polyurethane-based thermoplastic elastomer or styrene-based thermoplas-tic elastomer. The elastomer resin may be a liquid or a solid.

The resin component may be used singly in one kind or concurrently in two or more kinds.

Among the above, the resin component is preferably at least one selected from the group consisting of silicone resins, epoxy resins, acryl resins, polybutadiene rubber and polyester resins, more preferably at least one selected from the group consisting of silicone resins and epoxy resins, and still more preferably a silicone resin.

Specific examples of the silicone resin include curable type silicone resins. The curable type silicone resins may be either of condensation-curable type silicone resins and addi-tion reaction-curable type silicone resins, but are preferably addition reaction-curable type silicone resins.

It is preferable that the addition reaction-curable type silicone resin is composed of a silicone compound as a base component and a curing agent to cure the base component. The silicone compound to be used as the base component is preferably an organopolysiloxane having alkenyl groups, of which specific examples include both-vinyl-terminated organopolysiloxanes such as both-vinyl-terminated polydi-methylsiloxane, both-vinyl-terminated polyphenylmethylsi-loxane, both-vinyl-terminated dimethylsiloxane-diphenylsi-loxane copolymers, both-vinyl-terminated dimethylsiloxane-phenylmethylsiloxane copolymers and both-vinyl-terminated dimethylsiloxane-diethylsiloxane copolymers.

The silicone compound to be used as the base component has the viscosity at 25° C. of preferably 5 mPas or higher and 1,000 mPas or lower, more preferably 30 mPas or higher and 700 mPas or lower and still more preferably 100 mPas or higher and 600 mPas or lower.

Here, the viscosities of the silicone compound, and the curing agent described later may be measured by using a viscometer (Brookfield Rotational Viscometer DV-E) using a spindle No. 14 at a rotation frequency of 5 rpm at a measurement temperature of 25° C.

The curing agent to be used for the addition reaction-curable type silicone resin is not especially limited as long as being capable of curing the above-mentioned silicone compound as the base component, but is preferably an organohydrogenpolysiloxane which is an organopolysi-loxanes having two or more hydrosilyl groups (Sill). The ratio (molar ratio) of the hydrosilyl groups to the vinyl groups of the silicone compound is preferably 0.3 or higher and 5 or lower, more preferably 0.4 or higher and 4 or lower and still more preferably 0.6 or higher and 4 or lower. In the resin composition in which the diamond particles are used, although the reaction of the base component with the curing agent sometimes does not progress due to the diamond particles, when the molar ratio is 0.6 or higher, the reaction sufficiently progresses, enabling a sufficiently cured heat-dissipating member to be obtained.

Examples of the organohydrogenpolysiloxane include methylhydrosiloxane-dimethylsiloxane copolymers, polym-ethylhydrosiloxanes, polyethylhydrosiloxanes and methyl-hydrosiloxane-phenylmethylsiloxane copolymers. These may contain a hydrosilyl group at the terminal, or may not.

The viscosity at 25° C. of the curing agent is preferably 5 mPas or higher and 1,000 mPas or lower, more preferably 30 mPas or higher and 700 mPas or lower and still more preferably 100 mPas or higher and 600 mPas or lower.

When the viscosity ranges of the above base component and curing agent are made in the above ranges, since while the viscosity of the resin composition can be made in the predetermined range and the coatability of the resin com-position can be made good, the resin composition can be held in a certain shape after coating, the resin composition is enabled to be easily arranged on electronic parts and the like. Further, it becomes easy for the thermally conductive filler to be blended in a large amount, while a thermally conductive filler such as diamond particles is suitably dis-persed.

In the case where the addition reaction-curable type silicone resin is used as the resin component, the resin composition usually includes a curing catalyst. Examples of the curing catalyst include platinum-based catalysts, palla-dium-based catalysts and rhodium-based catalysts. The cur-ing catalyst is a catalyst to cure the silicone compound and the curing agent, which are a raw material of a silicone resin. The blended amount of the curing catalyst is, with respect to the total mass of the silicone compound and the curing agent, usually 0.1 to 200 ppm and preferably 0.5 to 100 ppm. The curing catalyst is, in the case of being used in the two-component curable type, preferably blended in the first component containing the base component, but may be contained in the second component containing the curing agent.

In the case of using the addition reaction-curable type silicone resin, the resin composition is preferably the two-component curable type, and is preferably one which is cured by mixing the first component containing the base component with the second component containing the cur-ing agent.

The silicone resin may be, for example, a silicone oil. Examples of the silicone oil include methyl phenyl silicone oil, dimethyl silicone oil and modified silicone oil. The viscosity, for example, at 25° C., of the silicone oil is preferably 5 mPas or higher and 1,000 mPas or lower, more preferably 30 mPas or higher and 700 mPas or lower, and still more preferably 50 mPas or higher and 600 mPas or lower.

The silicone oil is liquid at room temperature and normal pressure when it is blended, and is a liquid or gel component also when it is used. That is, the silicone oil is not cured with a curing agent or the other, or it is substantially non-curable such that it is still liquid or gelatinous even after the composition is cured. Therefore, when the silicone oil is used singly or in a relatively high blended proportion, a heat-dissipating member formed of the resin composition can be made pasty.

As the epoxy resin to be used as the resin component, there may be used an epoxy compound having at least one, preferably two or more epoxy groups. The epoxy compound is a curable resin, and it is typically a thermosetting resin.

Examples of the epoxy compound include bisphenol-type, novolac-type, naphthalene-type, triphenolalkane-type, biphenyl-type and alicyclic type ones, and halides thereof and hydrogenated ones thereof.

Then, as the epoxy resin, an epoxy compound may be used singly, but an epoxy resin is used which has the epoxy compound as the base component and further a curing agent added therein. As the curing agent, there are used polyaddition-type or catalyst-type ones. Examples of the polyaddition-type curing agent include polyamine-based curing agents, acid anhydride-based curing agents, polyphenol-based curing agents, polymercaptanes and dicyanediamide. Examples of the catalyst-type curing agent include tertiary amines, imidazols and Lewis acid complexes. These may be used singly in one kind or concurrently in two or more kinds.

In the case of using the epoxy resin, the resin composition is preferably the two-component curable type, and is preferably one which is cured by mixing the first component containing the base component with the second component containing the curing agent.

As the acryl resin to be used as the resin component, for example, one having photocurability is used. The acryl resin is a component constituting an acrylic polymer by being cured, and examples thereof include various types of acrylic compounds including (meth)acrylates such as alkyl (meth) acrylates, hydroxyalkyl (meth)acrylates, (meth)acrylic acid, (meth)acrylamides and urethane (meth)acrylates. The acryl resin may contain a vinyl monomer or the like copolymerizable with the acrylic compound.

The volume proportion of the resin component is, with respect to the total amount of the resin composition, preferably 8% by volume or higher and 50% by volume or lower, more preferably 10% by volume or higher and 40% by volume or lower, and still more preferably 15% by volume or higher and 35% by volume or lower. When the volume proportion of the resin component is not lower than these lower limit values, the thermally conductive filler such as the diamond particles dispersed in the resin component are enabled to be more held in the resin component, and the resin composition is enabled to maintain a certain shape. Further by making the volume proportion to be not higher than these upper limit values, the thermally conductive filler such as the diamond particles can be blended in a certain amount or more in the resin composition.

(Other Thermally Conductive Filler)

The resin composition of the present invention may further contain, as the thermally conductive filler, a thermally conductive filler (hereinafter, referred to also as "other thermally conductive filler") other than the diamond particles. By making the other thermally conductive filler to be contained, the filling fraction of the whole of the thermally conductive filler is improved, making the thermal conductivity to be raised and the heat dissipation properties to be improved.

As the other thermally conductive filler, from the viewpoint of the electric insulation properties, materials having a low electric conductivity are used; examples of the materials include carbides, nitrides, oxides, hydroxides and carbon-based materials other than diamond.

Examples of the carbides include silicon carbide, boron carbide, aluminum carbide, titanium carbide and tungsten carbide. Examples of the nitrides include silicon nitride, boron nitride, aluminum nitride, gallium nitride, chromium nitride, tungsten nitride, magnesium nitride, molybdenum nitride and lithium nitride. Examples of the oxides include iron oxide, silicon oxide (silica), aluminum oxide such as alumina and boehmite, magnesium oxide, titanium oxide, cerium oxide and zirconium oxide. Examples of the hydroxides include aluminum hydroxide, calcium hydroxide and magnesium hydroxide. Examples of the carbon-based materials include carbon black, graphite, graphene, fullerene, carbon nanotubes and carbon nanofibers. Further talc, which is a silicate mineral, and the like can also be used.

These other thermally conductive fillers may be used singly or concurrently in two or more kinds.

The thermal conductivity of the other thermally conductive filler is, from the viewpoint of improving the thermal conduction properties, preferably 8 W/(m·K) or higher and more preferably 20 W/(m·K) or higher.

The other thermally conductive filler is, from the viewpoint of the thermal conduction properties and the electric insulation properties, preferably one or more selected from the group consisting of aluminum oxide, magnesium oxide, boron nitride, talc, aluminum nitride and graphene, more preferably one or more selected from the group consisting of aluminum oxide, magnesium oxide and aluminum nitride and still more preferably one or more selected from the group consisting of aluminum oxide and magnesium oxide.

The sphericity of the other thermally conductive filler is, for example, 0.5 or higher, preferably 0.55 or higher and more preferably 0.6 or higher. The shape is closer to a sphere the nearer the sphericity is to 1; by making the sphericity high, it becomes easy for the filling fraction of the other thermally conductive filler to be raised. The upper limit of the sphericity is not especially limited, and is 1.

Further in the present invention, by making high the sphericity of, in addition to the other thermally conductive filler, the diamond particles as described above, it becomes easy for the total amount of the diamond particles and the other thermally conductive filler to be filled to be raised.

The shape of the other thermally conductive filler is not especially limited, and may be any of plate shapes, scaly shapes, needlelike shapes, fibrous shapes, tubular shapes, globular shapes and crushed shapes, but are preferably any of globular shapes and crushed shapes. Here, being globular shapes means being spherical or a shape approximating to a sphere, and has a sphericity of 0.8 or higher. The crushed shape has a sphericity of, for example, 0.5 or higher and lower than 0.8, preferably 0.55 or higher and lower than 0.8 and more preferably 0.6 or higher and lower than 0.8.

The average particle diameter of primary particles of the other thermally conductive filler is, for example, 0.1 μm or larger and 200 μm or smaller. When the average particle diameter is 0.1 μm or larger, by concurrent use thereof with the diamond particles, it becomes easy for the thermal conductivity to be raised. In the case where the resin component is a liquid component, the resin composition is prevented from being increased in the viscosity and can be made to have a low viscosity. Hence, it becomes easy for the coatability and the formability to be made good. Further by making the average particle diameter to be 200 μm or smaller, even when the other thermally conductive filler, besides the diamond particles, are filled densely, it becomes difficult for such a disadvantage that the filler is not homogeneously dispersed to occur. From these viewpoints, the average particle diameter of primary particles of the other thermally conductive filler is preferably 0.5 μm or larger and 150 μm or smaller and more preferably 1 μm or larger and 100 μm or smaller.

In the case where the resin composition contains the other thermally conductive filler, the filling fraction of the other thermally conductive filler may suitably be regulated so that the total filling fraction of the filler falls into the range described later, but is preferably 60% by volume or lower, more preferably 50% by volume or lower and still more preferably 40% by volume or lower. By making the filling fraction not higher than these upper limit values, since the diamond particles in a certain amount or more can be blended in the resin composition, it becomes easy for the thermal conductivity to be raised. Further the filling fraction of the other thermally conductive filler is preferably 2% by volume or higher, more preferably 10% by volume or higher and still more preferably 20% by volume or higher. By making the filling fraction not lower than these lower limit values, it becomes easy for the effect of the other thermally conductive filler blended to be exhibited.

Further in the case where the resin composition contains the other thermally conductive filler, the filling fraction of the other thermally conductive filler is, from the viewpoint of the electric insulation properties and the thermal conduction properties, with respect to the filling fraction of the diamond particles, preferably 0.1 or higher and 5 or lower and more preferably 0.2 or higher and 3 or lower, and from the viewpoint of more enhancing the electric insulation properties, still more preferably 0.3 or higher and 2 or lower.

The other thermally conductive filler may be, for example, thermally conductive filler having an average particle diameter of primary particles of 10 μm or larger and 200 μm or smaller (hereinafter, referred to also as "large particle diameter thermally conductive filler"), or thermally conductive filler having an average particle diameter of primary particles of 0.1 μm or larger and smaller than 10 μm (hereinafter, referred to also as "small particle diameter thermally conductive filler"). Further, as the other thermally conductive filler, both of the large particle diameter thermally conductive filler and the small particle diameter thermally conductive filler may be used.

The large particle diameter thermally conductive filler has the average particle diameter of primary particles of preferably 15 μm or larger and 200 μm or smaller, more preferably 18 μm or larger and 150 μm or smaller and still more preferably 20 μm or larger and 100 μm or smaller. The large particle diameter thermally conductive filler may be used singly in one kind thereof, but may be used concurrently in two or more kinds thereof having different average particle diameters of primary particles from each other.

The small particle diameter thermally conductive filler has the average particle diameter of primary particles of preferably 0.2 μm or larger and 8 μm or smaller, more preferably 0.5 μm or larger and 7 μm or smaller, and still more preferably 1 μm or larger and 7 μm or smaller.

The small particle diameter thermally conductive filler may be used singly in one kind thereof, but may be used concurrently in two or more kinds thereof having different average particle diameters of primary particles from each other.

The other thermally conductive filler may be surface-treated. By surface-treating the other thermally conductive filler, it becomes easy for it to conform to the resin component, and it becomes easy for it to be homogeneously dispersed together with a large amount of the diamond particles in the resin component.

The other thermally conductive filler is surface-treated with a surface treating agent such as a silane compound, an organotitanium compound, an organoaluminum compound or a phosphate compound, and preferably with a silane compound. Here, since the details and the treatment method of the surface treatment are the same as those of the surface treatment carried out for the diamond particles, the descriptions thereof will be omitted.

In the case of using two or more kinds of the other thermally conductive fillers, all of the kinds may be surface-treated, or only part thereof may be surface-treated.

In the case where the other thermally conductive filler is surface-treated, it is preferable that the other thermally conductive filler is mixed with the diamond particles and surface-treated simultaneously with the diamond particles, but the other thermally conductive filler may be surface-treated separately from the diamond particles.

In the present invention, it is preferable that the other thermally conductive filler is contained by being combined complementarily with the diamond particles. Specifically, in order to raise the thermal conductivity, it is preferable that with regard to a thermally conductive filler (the diamond particles and the other thermally conductive filler), large particle diameter filler and small particle diameter filler are combined, and both the large particle diameter filler and the small particle diameter filler are blended in the predetermined amounts or more, respectively.

Therefore, in the case where the diamond particles contain no large particle diameter diamond, or in the case where even when the large particle diameter diamond is contained, the amount thereof is small, it is better that at least the large particle diameter thermally conductive filler is blended as the other thermally conductive filler.

Similarly, in the case where the diamond particles contain no small particle diameter diamond, or in the case where even when the small particle diameter diamond is contained, the amount thereof is small, it is better that at least the small particle diameter other thermally conductive filler is blended as the thermally conductive filler.

Further in the case where diamond particles contain both of the small particle diameter diamond and the large particle diameter diamond in suitable amounts, respectively, it is preferable that for the thermally conductive filler, both of the small particle diameter thermally conductive filler and the large particle diameter thermally conductive filler may be blended in suitable amounts, respectively.

In the whole of the thermally conductive filler (that is, the total of the diamond particles and the other thermally conductive filler), the volume ratio (large particle diameter/small particle diameter) of the large particle diameter filler to the small particle diameter filler is, for example, 0.1 or higher and 10 or lower. The volume ratio is preferably 0.25 or higher and 8 or lower and more preferably 0.5 or higher and 5 or lower. Here, the large particle diameter filler means thermally conductive filler having an average particle diameter of primary particles of 10 μm or larger and 200 μm or smaller, and the volume thereof is a total volume of the large particle diameter diamond particles and the large particle diameter thermally conductive filler. The small particle diameter filler means thermally conductive filler having an average particle diameter of primary particles of 0.1 μm or larger and smaller than 10 μm, and the volume thereof is a total volume of the small particle diameter diamond particles and the small particle diameter thermally conductive filler.

By making the volume ratio (large particle diameter/small particle diameter) in the whole of the thermally conductive filler in the above range, even when the content of the thermally conductive filler is made to be a large amount, the thermally conductive filler can be homogeneously dispersed in the resin component. Further the thermal conductivity of the resin composition can be made sufficiently high.

The total filling fraction of the thermally conductive filler (that is, the total of a filling fraction of the diamond particles and a filling fraction of the other thermally conductive filler) is preferably 40% by volume or higher and 92% by volume or lower, more preferably 50% by volume or higher and 90% by volume or lower and still more preferably 60% by volume or higher and 86% by volume or lower. By making the total filling fraction to be not lower than these lower limit values, the thermal conductivity can be made high. By making the total filling fraction to be not higher than the upper limit values, it becomes easy for the thermally conductive filler to be suitably dispersed in the resin component.

(Other Additives)

The resin composition of the present invention may contain additives usually used for heat-dissipating members, such as a dispersant, an antioxidant, a thermal stabilizer, a colorant, a flame retardant and an antistatic agent, if necessary. The resin composition, in the case of using a curable resin such as a thermosetting resin, may contain a reaction inhibitor. By making the reaction inhibitor to be contained and inhibiting the catalytic activity and the like of the curing catalyst, the shelf life and pot life of the resin composition can be prolonged. The resin composition, in the case of using a photocurable resin, may contain a photopolymerization initiator.

As the reaction inhibitor, a well-known one can be used, but in the case where the resin component is a silicone resin, examples of the reaction inhibitor include acetylene compounds such as 1-ethynyl-1-cyclohexanol and 3,5-dimethyl-1-hexyn-3-ol, various types of nitrogen compounds such as tributylamine and tetramethylethylenediamine, organophosphorus compounds such as triphenylphosphine, oxime compounds, and organochloro compounds.

In a curable type silicone resin, the above reaction inhibitor can be used for either of one-component type and two-component type resins. In the case of the two-component type resin, the reaction inhibitor may be blended in either of the first component and the second component, but is included favorably in a component in which the curing catalyst is blended, therefore, preferably in the first component.

The blended amount of the reaction inhibitor is, with respect to 100 parts by mass of the resin component (that is, in the curable resin, the total amount of the base component and the curing agent), preferably 0.01 part by mass or larger and 2 parts by mass or smaller and more preferably 0.1 part by mass or larger and 1 part by mass or smaller.

(Physical Properties of the Resin Composition)

By making the resin composition of the present invention to contain, as the thermally conductive filler, the diamond particles or the diamond particles and the thermally conductive filler other than the diamond particles, and making the above total metal content in a predetermined range, the thermal conductivity of the resin composition is enhanced.

The thermal conductivity of the resin composition is preferably 3.5 W/(m·K) or higher and more preferably 4.0 W/(m·K) or higher. The thermal conductivity of the resin composition is, though the higher the thermal conductivity, the better the heat dissipation properties, for example, 25 W/(m·K) or lower, and it may be practically favorably 15 W/(m·K) or lower.

Here, the thermal conductivity, in the case where the resin composition is a curable one, needs to be measured as that of the resin composition after being cured. The thermal conductivity is measured by a steady method.

The resin composition of the present invention favorably has certain flowability at room temperature (25° C.) and normal pressure (1 atm). Specifically, the viscosity at 25° C. of the resin composition is preferably 400 Pas or lower. By making the viscosity to be 400 Pas or lower, it becomes easy for the coatability, the formability and the like to be made good. From the viewpoint of the coatability and the formability, the viscosity at 25° C. of the resin composition is more preferably made to be 300 Pas or lower. The viscosity at 25° C. of the resin composition is, in order to prevent liquid sagging and the like from occurring, preferably 15 Pas or higher, more preferably 50 Pas or higher and still more preferably 100 Pas or higher.

Here, in the present description, the viscosity of the resin composition is a viscosity at 25° C., and measured according to JIS K6249, and indicates a viscosity using a rotational viscometer spindle No. 16 and at a rotation frequency of 10 rpm and at 3 min.

Further, the viscosity of the resin composition is, in the case where the resin composition is a curable one, a viscosity of the resin composition before being cured, and is, for example, in the case of being of two-component type resin, a viscosity just after the first component and the second component are mixed.

(Preparation of the Resin Composition)

The resin composition of the present invention may be prepared by mixing the resin component, the diamond particles, and further the other thermally conductive filler and the additives such as the dispersant, which are blended according to needs. A method of mixing these is not especially limited, but may involve, for example, adding the diamond particles and, further the other thermally conductive filler and the additives, which are blended according to needs, to the resin component, and thereafter stirring or kneading the mixture to prepare the resin composition. In the case of using the two-component type thermosetting resin as the resin component, the resin composition may be prepared by mixing the first component and the second component, which have been prepared in advance, as described above. When the first component and the second component are prepared, they can be prepared similarly by mixing the various components.

Although it is favorable that the thermally conductive filler and the diamond are surface-treated with the silane compound as described above, and then blended with the resin component, an integral blend method may be used. That is, the thermally conductive filler or the diamond may be mixed with the resin component to which the above silane compound or the like is added, without being subjected to the above surface treatment.

[Heat-Dissipating Member]

The heat-dissipating member of the present invention is formed of the above resin composition. The heat-dissipating member, for example, in the case where the resin component contains a curable resin, becomes enabled to be obtained as a heat-dissipating member formed into a predetermined shape by making the resin composition into the predetermined shape and curing the resultant by being suitably subjected to heating or the like. Further in the case where a photocurable resin is used, the resin composition can be cured by making the resin composition into a predetermined shape and thereafter curing the resultant by irradiation with light rays such as ultraviolet rays. Also, in the case except for the case where the resin component contains a curable resin, the heat-dissipating member may be obtained by making the resin composition into a predetermined shape. A method of making the resin composition into a predetermined shape is not especially limited, and a shape such as a thin film, sheet, block or indeterminate shape can be made by coating, casting, potting, extruding or the like.

The heat-dissipating member of the present invention is used, for example, inside electronic devices. That is, the present invention also provides an electronic device comprising the heat-dissipating member. The heat-dissipating member of the present invention, since being good in the electric insulation properties and the thermal conduction properties, even when being used inside electronic devices, can secure high heat dissipation properties without causing abnormal operations. More specifically, the heat-dissipating member is arranged on electronic parts and used in order to dissipate heat generated in the electronic parts. Further, it is preferable that the heat-dissipating member of the present invention is used by being arranged so as to fill gaps between two facing members. The two facing members may be: for example, one is an electronic part, and the other is any of one to let heat escape from the electronic part, such as a heat sink, a housing of an electronic device, a substrate and the like.

EXAMPLES

Hereinafter, Examples of the present invention will be described. However, the present invention is not limited to the following Examples.

Measurement methods and evaluation methods of physical properties of the present invention are as follows.
<Measurement Method of Metal Content>

Diamond particles were separated from a fabricated resin composition, and then the amount of each metal species contained in the separated diamond particles was measured by ICP analysis. Specifically, in each Example and Comparative Example, the measurement was carried out as follows.

First, the resin composition was put in a solvent (a mixed solvent of 50% by mass of toluene and 50% by mass of xylene) to dissolve a resin component such as a polymer (10-fold diluted (mass ratio)), and the diamond particles and the resin component such as the polymer were separated by using a centrifugal separator.

10 g of the separated diamond particles were baked in a benchtop electric furnace (manufactured by Nitto Kagaku Co., Ltd., trade name: "NHK-170") at 900° C. for 48 hours to decompose and burn off the diamond particles. Aqua regia (a mixed liquid of concentrated nitric acid (1 ml) and concentrated hydrochloric acid (3 ml)) and 6 ml of ultrapure water were added to a residue after the burning-off; thereafter, the resultant was heated by using a sand bath to decompose and dry up the residue at 150° C. Then, ultrapure water was again added to the resultant to adjust the volume to 10 ml, and then allowed to stand still at 23° C. for 1 day. Each metal species was quantitatively analyzed with using the supernatant liquid by ICP analysis. A measured weight of the metal species/a weight of the diamond particles before the burning-off was calculated and the result was indicated on the ppm order. Here, the ICP analysis was carried out under the following condition by an ICP atomic emission spectrometer (manufactured by Hitachi High-Technologies Corp., "SPS5100").

In the case where other thermally conductive filler (excluding carbon-based materials) other than the diamond particles was further contained, the whole of thermally conductive filler was separated from the resin composition, and heated at 900° C. as described above. Here, since the thermally conductive filler other than the diamond particles was not generally decomposed by being heated, but the diamond particles were decomposed and burned off, by subtracting a weight of thermally conductive filler remaining after the heating from a weight of the whole of the separated thermally conductive filler, the weight of the diamond particles were determined. Since a residue other than thermally conductive filler after the heating was substantially a component originated from the diamond particles, by carrying out ICP analysis on the residue component, each metal species in the diamond particles was able to be quantitatively analyzed. Then, the content (ppm) of each metal in the diamond particles was determined from the analysis result and the weight of the diamond particles.
<ICP Analysis Condition>
High frequency output: 1.2 kW spray chamber: coaxial-type cyclone chamber
Plasma gas flow volume: 15 L/min Use of argon humidifier: none
Assist gas flow volume: 1.5 L/min Analysis wavelength: Fe: 238.204 nm, Co: 228.615 nm, Ni: 230.299 nm, Cr: 267.716 nm
Carrier gas flow volume: 0.9 L/min Integration time: 3 s
Torch: quartz torch Number of repetition: 5 times
Nebulizer: glass nebulizer Internal standard correction: none
<Thermal Conductivity>
The thermal conductivity of a test sample obtained in each Example and Comparative Example was measured by a steady method using a measuring instrument, "DYNTIM", manufactured by Menter Graphics Corp. The thermal conductivity was evaluated according to the following evaluation criteria based on the measured thermal conductivity.

The case where the thermal conductivity was 1.2 times or more that of Comparative Examples (Comparative Examples 2, 3), which used alumina as a thermally conductive filler and had the same filling fraction, was evaluated as "A"; the case where more than 1 time and less than 1.2 times, as "B"; and the case where 1 time or less, as "C".
<Evaluation of the Electric Insulation Properties>
A direct-current voltage was applied to a test sample obtained in each Example and Comparative Example at 25° C. in the thickness direction so that the voltage was raised at a rate of 0.33 kV/s, by using a withstand voltage tester (manufactured by ETECH Electronics LLC, "Model 7473"). A voltage at which a current of 10 mA flowed through the test sample was defined as a dielectric breakdown voltage. The dielectric breakdown voltage was normalized by dividing the dielectric breakdown voltage by a thickness of the test sample, and the dielectric breakdown strength was calculated. The dielectric breakdown strength was evaluated according to the following criteria.
S: 15 kV/mm or higher
A: 12 kV/mm or higher and lower than 15 kV/mm
B: 8 kV/mm or higher and lower than 12 kV/mm
C: lower than 8 kV/mm <Evaluations of the Abrasion and Crushing Resistance>

5 g of a mixture of diamond particles in a blended proportion of each of Examples and Comparative Examples was put in a container, and three times subjected to 20-min stirring at 2,000 rpms in a rotary and revolutionary mixer (manufactured by Thinky Corp., type: "ARE310"). The change in the particle size distribution between before the test and after the test was traced by using a dry laser diffraction-type particle size distribution analyzer (manufactured by Malvern Panalytical Ltd., trade name: "Mastersizer 3000"), and the abrasion and crushing resistance was evaluated according to the following evaluation criteria. In Table 1, the evaluation results and the change rates (%) are indicated.

S: The change in the average particle diameter (d50) was 0.5% or smaller, being excellent in the abrasion and crushing resistance.

A: The change in the average particle diameter (d50) was larger than 0.5% and 1% or smaller, being excellent in the abrasion and crushing resistance.

B: The change in the average particle diameter (d50) was larger than 1% and 1.5% or smaller, being good in the abrasion and crushing resistance.

C: The change in the average particle diameter (d50) was larger than 1.5%, being insufficient in the abrasion and crushing resistance.

<Evaluation of the Coatability>

The coatability was evaluated by using the viscosity at 25° C. of a resin composition obtained in each Example and Comparative Example and according to the following evaluation criteria. Here, the viscosity at 25° C. was measured by the measurement method described in the present description.

A: The viscosity was 300 Pas or lower and a test sample was able to be fabricated in excellent coatability.

B: The viscosity was higher than 300 Pas and 400 Pas or lower, and a test sample was able to be fabricated with no practical problem.

C: The viscosity was higher than 400 Pas, and it was difficult to fabricate a test sample by coating.

Thermally conductive filler used in Examples and Comparative Examples were as follows.

<Diamond Particles>

(Large Particle Diameter)

A-1: manufactured by Tomei Diamond Co., Ltd., trade name: "TMS 325-400", average particle diameter of primary particles: 50 μm, sphericity: 0.9, globular product B-1: manufactured by Iljin Diamond Co., Ltd., "IMPM40-60", average particle diameter of primary particles: 50 μm, sphericity: 0.6, crushed product C-1: manufactured by Element Six Co., Ltd., trade name: "MDA40-80", average particle diameter of primary particles: 50 μm, sphericity: 0.6, crushed product D-1: manufactured by Hyperion Materials & Technologies Inc., trade name: "GMM40-60", average particle diameter of primary particles: 50 μm, sphericity: 0.6, crushed product E-1: manufactured by Saint Gobain Co., Ltd., trade name: "MBE40-60", average particle diameter of primary particles: 50 μm, sphericity: 0.6, crushed product F-1: manufactured by Element Six Co., Ltd., trade name: "PDA989", average particle diameter of primary particles: 50 μm, sphericity: 0.9, globular product Z-1: manufactured by Changsha Shili Superhard Material Co., Ltd., trade name: "MBD 325-400", average particle diameter of primary particles: 50 μm, sphericity: 0.9, globular product (Small Particle Diameter)

A-2: manufactured by Tomei Diamond Co., Ltd., trade name: "CMM4-8", average particle diameter of primary particles: 4 μm, sphericity: 0.6, crushed product B-2: manufactured by Iljin Diamond Co., Ltd., trade name: "IMPM4-8", average particle diameter of primary particles: 4 μm, sphericity: 0.6, crushed product C-2: manufactured by Element Six Co., Ltd., trade name: "MDA4-8", average particle diameter of primary particles: 4 μm, sphericity: 0.6, crushed product D-2: manufactured by Hyperion Materials & Technologies Inc., trade name: "GMM4-8, average particle diameter of primary particles: 4 μm, sphericity: 0.6, crushed product E-2 manufactured by Saint Gobain Co., Ltd., trade name: "MBE4-8", average particle diameter of primary particles: 4 μm, sphericity: 0.6, crushed product <Other Thermally Conductive Filler>

(Aluminum Oxides (Aluminas))

G-1: manufactured by Denka Corp., trade name: "DAM-45", average particle diameter of primary particles: 50 μm, sphericity: 0.9, globular product G-2: manufactured by Denka Corp., trade name: "DAM-03", average particle diameter of primary particles: 4 μm, sphericity: 0.9, globular product (AIN (Aluminum Nitride))

H-1: manufactured by Toyo Aluminum K.K., trade name: "TFZ-N05", average particle diameter of primary particles: 5 μm, sphericity: 0.9, globular product Examples 1 to 4 and 6 to 10, and Comparative Example 1

To 2.1 parts by mass of a both-vinyl-terminated organopolysiloxane constituting a base component of an addition reaction-curable type silicone resin as a resin component, there were added blended parts (parts by mass) indicated in Table 1 of diamond particles, and further 0.015 part by mass of a reaction retarder and a catalytic amount of a platinum catalyst, to thereby prepare a first component of a resin composition. Also, to 2.1 parts by mass of an organohydrogenpolysiloxane constituting a curing agent of the addition reaction-curable type silicone resin, blended parts (parts by mass) indicated in Table 1 of diamond particles were added, and three times subjected to 20-min stirring at 2,000 rpms in a rotary and revolutionary mixer (manufactured by Thinky Corp., type: "ARE310") to thereby prepare a second component of the resin composition. A test sample was taken from the resin composition obtained by mixing the first component and the second component in a mass ratio (first component/second component) of 1:1, and measured.

Example 5

The operation was carried out similarly as in Example 1, except for that to 2.1 parts by mass of a dimethylpolysiloxane (silicone oil, trade name: "SH200CV", manufactured by Mitsubishi Chemical Corp.) as a resin component, there were added the blended parts indicated in Table 1 of diamond particles to thereby prepare a resin composition, and a test sample was fabricated from the resin composition.

Example 11

To 4.9 parts by mass of an epoxy compound (trade name: "Epikote", manufactured by Mitsubishi Chemical Corp.) and 0.1 part by mass of a curing agent (trade name: "DICY7", manufactured by Mitsubishi Chemical Corp.), as a resin component, there were added the blended parts indicated in Table 1 of diamond particles to thereby prepare a resin composition, and thereafter, the resin composition was put in an oven at 150° C. for 2 hours to be cured. The operation was carried out similarly as in Example 1, except for fabricating a test sample from the obtained cured resin material.

Example 12

2.0 parts by mass of an acryl resin (trade name: "4-hydroxybutyl acrylate", manufactured by Osaka Organic Chemical Industry Ltd.) and 0.1 part by mass of an acryl resin (trade name: "CN9005", manufactured by Arkema Co., Ltd.), as a resin component, were mixed and 0.01 part by mass of a photopolymerization initiator (trade name: "OMNIRAD 819", manufactured by IGM Resins B.V.) was added to the resin component. The blended parts indicated in Table 1 of diamond particles were further added to the obtained mixture to thereby prepare a resin composition, and the resin composition was irradiated with UV rays of 365 nm and 100 mW/cm$^2$ by a UV lamp for 30 seconds to be cured. The operation was carried out similarly as in Example 1, except for fabricating a test sample from the obtained cured resin material.

Comparative Examples 2 and 3

The operation was carried out similarly as in Example 1 by adding the blended parts indicated in Table 1 of alumina in place of the diamond particles.

TABLE 1

| | | Example | | | | | | | |
|---|---|---|---|---|---|---|---|---|---|
| | | 1 | 2 | 3 | 4 | 5 | 6 | 7 | 8 |
| Diamond particles (large particle diameter) | A-1 | 12 | | | | 12 | | | 12 |
| | B-1 | | 12 | | | | | | |
| | C-1 | | | 12 | | | | | |
| | D-1 | | | | 12 | | | | |
| | E-1 | | | | | | 12 | | |
| | F-1 | | | | | | | | |
| | Z-1 | | | | | | | 12 | |
| Diamond particles (small particle diameter) | A-2 | 6 | | | | 6 | | 6 | 6 |
| | B-2 | | 6 | | | | | | |
| | C-2 | | | 6 | | | | | |
| | D-2 | | | | 6 | | | | |
| | E-2 | | | | | | 6 | | |
| Alumina | G-1 | | | | | | | | |
| | G-2 | | | | | | | | |
| AlN | H-1 | | | | | | | | |
| Silicone resin | addition reaction-type | 2.1 | 2.1 | 2.1 | 2.1 | | 2.1 | 2.1 | 5 |
| | silicone oil | | | | | 2.1 | | | |
| Epoxy resin | base component | | | | | | | | |
| | curing agent | | | | | | | | |
| Acryl resin | resin | | | | | | | | |
| Filling fraction (% by volume) | diamond | 70 | 70 | 70 | 70 | 70 | 70 | 70 | 50 |
| | alumina | | | | | | | | |
| | aluminum nitride | | | | | | | | |
| | resin component | 30 | 30 | 30 | 30 | 30 | 30 | 30 | 50 |
| Thermal conductivity | W/(m · K) | 4.3 | 4.2 | 4.1 | 4.0 | 4.3 | 3.9 | 4 | 1.7 |
| | evaluation | A | A | A | A | A | A | A | A |
| Electric insulation properties | | A | A | A | A | A | B | S | A |
| Coatability | viscosity (Pa · s) | 216 | 268 | 245 | 238 | 218 | 242 | 291 | 189 |
| | evaluation | A | A | A | A | A | A | A | A |
| Abrasion and crushing resistance | | A | A | A | A | A | B | S | A |
| | | 1 | 0.9 | 0.8 | 0.8 | 1 | 1.1 | 0.4 | 1 |
| Amounts of impurities (ppm) | Fe | 8.82 | 11.51 | 13.05 | 15.10 | 8.82 | 80.63 | 38.26 | 8.82 |
| | Co | 1.64 | 0.82 | 2.15 | 1.96 | 1.64 | 6.48 | 3.24 | 1.64 |
| | Ni | 4.37 | 3.78 | 4.36 | 4.52 | 4.37 | 30.11 | 21.65 | 4.37 |
| | Cr | 1.08 | 1.01 | 1.57 | 2.11 | 1.08 | 0.77 | 1.03 | 1.08 |
| | Total amount | 15.92 | 17.12 | 21.13 | 23.68 | 15.92 | 118.00 | 64.18 | 15.92 |

| | | Example | | | | Comparative Example | | |
|---|---|---|---|---|---|---|---|---|
| | | 9 | 10 | 11 | 12 | 1 | 2 | 3 |
| Diamond particles (large particle diameter) | A-1 | 9 | 9.5 | 12 | 12 | | | |
| | B-1 | | | | | | | |
| | C-1 | | | | | | | |
| | D-1 | | | | | | | |
| | E-1 | | | | | | | |
| | F-1 | | | | | 12 | | |
| | Z-1 | | | | | | | |

TABLE 1-continued

| | | | | | | | | |
|---|---|---|---|---|---|---|---|---|
| Diamond particles (small particle diameter) | A-2 | | | 6 | 6 | 6 | | |
| | B-2 | | | | | | | |
| | C-2 | | | | | | | |
| | D-2 | | | | | | | |
| | E-2 | | | | | | | |
| Alumina | G-1 | 9.2 | | | | | 14 | 12 |
| | G-2 | | | | | | 7 | 6 |
| AlN | H-1 | | 8 | | | | | |
| Silicone resin | addition reaction-type silicone oil | 2.1 | 2.2 | | | 2.1 | 2.2 | 4.5 |
| Epoxy resin | base component | | | 4.9 | | | | |
| | curing agent | | | 0.1 | | | | |
| Acryl resin | resin | | | | 2.1 | | | |
| Filling fraction (% by volume) | diamond | 36 | 36 | 50 | 70 | 70 | | |
| | alumina | 34 | | | | | 70 | 50 |
| | aluminum nitride | | 34 | | | | | |
| | resin component | 30 | 30 | 50 | 30 | 30 | 30 | 50 |
| Thermal conductivity | W/(m · K) | 3.7 | 3.8 | 1.8 | 4.2 | 3.5 | 3 | 1.2 |
| | evaluation | A | A | A | A | B | C | C |
| Electric insulation properties | | B | B | A | A | C | S | S |
| Coatability | viscosity (Pa · s) | 190 | 225 | 320 | 180 | 222 | 185 | 105 |
| | evaluation | A | A | B | A | A | A | A |
| Abrasion and crushing resistance | | B | B | A | A | C | — | — |
| | | 1.3 | 1.3 | 0.9 | 0.9 | 1.8 | | |
| Amounts of impurities (ppm) | Fe | 5.76 | 5.76 | 8.82 | 8.82 | 219.32 | — | — |
| | Co | 0.05 | 0.05 | 1.64 | 1.64 | 4.11 | — | — |
| | Ni | 3.38 | 3.38 | 4.37 | 4.37 | 102.12 | — | — |
| | Cr | 0.85 | 0.85 | 1.08 | 1.08 | 6.01 | — | — |
| | Total amount | 10.04 | 10.04 | 15.92 | 15.92 | 331.56 | — | — |

* Values of diamond particles, alumina, AlN, silicone resin, epoxy resin and acryl resin in Table 1 are expressed in parts by mass.

As indicated in Table 1, in each Example in which the total metal content in the diamond particles was 5 ppm or higher and 300 ppm or lower, the abrasion and crushing resistance of the diamond particles became good, and the resin composition was able to be made good in the electric insulation properties and simultaneously high in the thermal conductivity, that is, excellent in the thermal conduction properties. By contrast, as indicated in Comparative Example 1, when the total metal content became high, the thermal conduction properties and the electric insulation properties were lowered due to the influence of impurities. Also, in Comparative Examples 2 and 3, in which no diamond particles were used, the thermal conduction properties were insufficient.

The invention claimed is:

1. A resin composition, comprising a resin component and diamond particles, the diamond particles having a total metal content constituted from iron, nickel, cobalt, and chromium of 15 ppm or higher and 300 ppm or lower, the diamond particles having a content of iron of 7 ppm or higher and 50 ppm or lower, and the diamond particles having a content of nickel of 3.5 ppm or higher and 25 ppm or lower.

2. The resin composition according to claim 1, wherein the diamond particles have an average particle diameter of primary particles of 0.1 μm or larger.

3. The resin composition according to claim 1, wherein the resin composition has a filling fraction of the diamond particles of 30% by volume or higher and 90% by volume or lower.

4. The resin composition according to claim 1, wherein the resin component is at least one selected from the group consisting of epoxy resins, silicone resins, acryl resins, polybutadiene rubbers and polyester resins.

5. The resin composition according to claim 1, wherein the resin composition further comprises a thermally conductive filler other than the diamond particles.

6. The resin composition according to claim 5, wherein the resin composition comprises, as the thermally conductive filler other than the diamond particles, at least one or more selected from the group consisting of carbides, nitrides, oxides, hydroxides and carbon materials other than diamond.

7. The resin composition according to claim 5, wherein the thermally conductive filler other than the diamond particles has an average particle diameter of primary particles of 0.1 μm or larger and 200 μm or smaller.

8. The resin composition according to claim 1, wherein the resin component comprises an addition reaction-curable type silicone resin comprising an organopolysiloxane having alkenyl group and an organopolysiloxane having two or more hydrosilyl group.

9. A heat-dissipating member, which is formed of the resin composition according to claim 1.

10. An electronic device, comprising the heat-dissipating member according to claim 9.

* * * * *